United States Patent
Lin et al.

(10) Patent No.: US 7,929,517 B2
(45) Date of Patent: Apr. 19, 2011

(54) VOICE OVER IP AUTO-SWITCHING/BACKUP FOR EMERGENCY CALLS

(75) Inventors: Frank Lin, Diamond Bar, CA (US); Tsutomu Sakai, Cypress, CA (US)

(73) Assignee: Cisco Technology, Inc., San Jose, CA (US)

( * ) Notice: Subject to any disclaimer, the term of this patent is extended or adjusted under 35 U.S.C. 154(b) by 1350 days.

(21) Appl. No.: 11/096,565

(22) Filed: Apr. 1, 2005

(65) Prior Publication Data

US 2006/0221938 A1  Oct. 5, 2006

(51) Int. Cl.
*H04L 12/64* (2006.01)
(52) U.S. Cl. .................. 370/352; 370/354
(58) Field of Classification Search ............ 370/352, 370/354
See application file for complete search history.

(56) References Cited

U.S. PATENT DOCUMENTS

| | | | | |
|---|---|---|---|---|
| 5,414,342 A * | 5/1995 | Mammano et al. | ........... | 323/288 |
| 5,666,045 A * | 9/1997 | Grodevant | ........... | 323/282 |
| 6,711,160 B2 * | 3/2004 | Chan et al. | ........... | 370/354 |
| 2002/0116464 A1 * | 8/2002 | Mak | ........... | 709/206 |
| 2008/0195727 A1 * | 8/2008 | Diomelli | ........... | 709/224 |

* cited by examiner

*Primary Examiner* — Rasha S Al Aubaidi
(74) *Attorney, Agent, or Firm* — Haynes and Boone, LLP.

(57) ABSTRACT

A VoIP adapter module for a VoIP phone system switches the phone connection from a broadband connection to a wired connection when a power outage or a broadband disconnection is detected. The switch is accomplished by establishing a connection from a telephone connected to an RJ11 port on the module to a wired channel connected to a backup RJ11 port on the module. Detection for power outage is by comparing the device voltage with a reference voltage, and detection for broadband connection is by sending out a PING packet and waiting to see if a return packet is received.

14 Claims, 2 Drawing Sheets

VOICE OVER IP AUTO-SWITCHING/BACKUP FOR EMERGENCY CALLS

BACKGROUND

1. Field of Invention

The present invention relates to Voice Over IP (VoIP) systems, and in particular, to such systems that enable emergency calls in the event of loss of VoIP service.

2. Related Art

Voice over Internet Protocol (VoIP) telephone services are becoming more and more prevalent in today's communications. VoIP allows voice calls using Internet Protocol ("IP") networks, such as the Internet, corporate intranets, or any IP network, as an alternative to traditional public switched telephone networks ("PSTN"). Unlike the PSTN, which is circuit-switched, the Internet is packet-switched. As such, communications on the Internet is accomplished by transmitting and receiving packets of data. In addition to data, each packet contains a destination address to ensure that it is routed correctly. The format of these packets is defined by the IP. One type of allowable data is encoded, digitized voice, known as Voice over IP. VoIP is voice that is packetized as defined by IP, and communicated over the Internet for telephone-like communication. Individual VoIP packets may travel over different network paths to reach the final destination where the packets are reassembled in correct sequence to reconstruct the voice information.

VoIP provides several advantages over PSTNs or POTS (Plain Old Telephone Service). First, there is a savings in money compared to the need to use traditional tolled telecommunications networks. Additionally, Voice over IP enables the management of voice and data over a single network. Further, with the use of IP phones, the costs and complexity for modifying the system are greatly reduced, such as when a user moves or needs to add or make changes. Moreover, additional and integrated new services, such as integrated messaging, bandwidth on demand, voice e-mails, the development of "voice portals" on the Web, simplified setting up and tearing down, and transferring of phone calls, are possible.

Using VoIP technology, phone systems can communicate with each other over existing IP data networks typically present between remote sites. This can eliminate the need for expensive, dedicated circuits between facilities. The shared bandwidth can also be used for voice calls and data communication simultaneously, so that no bandwidth is required to be dedicated to voice or data.

Another advantage of a VoIP system is the ability to implement a phone system over an existing data network that is already connecting workstations within a local area network, such as over an Ethernet. An Ethernet operates over twisted wire and over coaxial cable for connecting various devices, such as computers, printers, workstations, terminals, servers, and the like, within the same building or site. Because the Ethernet utilizes frame packets for transmitting information, VoIP can utilize such packet switching capabilities to connect IP phones onto the Ethernet.

While VoIP provides numerous advantages over the PSTN or POTS, such phone systems also present certain problems not associated with conventional telephone systems. For example, because communication is effected through the Internet, disruptions in the Internet can disrupt or degrade the VoIP communication, due to occurrences such as packet loss, packet delay, corrupted packets, and power outages. While such problems may be acceptable for purposes of data transmission and most voice communications, it is generally unacceptable for certain types of voice communications, such as emergency or 911 calls. In the event of a power outage or a loss in the broadband connection, the user will be unable to place a 911 call over the VoIP phone system. The user would then need to place the emergency call through another channel, such as a cell phone or a conventional land line phone. Even if such a channel were available, which may not always be the case, valuable time may be lost in placing the emergency call.

Therefore, there is a need for a VoIP phone system that is capable of connecting an emergency 911 call when a power failure occurs or when the broadband connection is down.

BRIEF DESCRIPTION OF THE DRAWINGS

It should be appreciated that like reference numerals are used to identify like elements illustrated in one or more of the figures.

DETAILED DESCRIPTION

Figure 1:
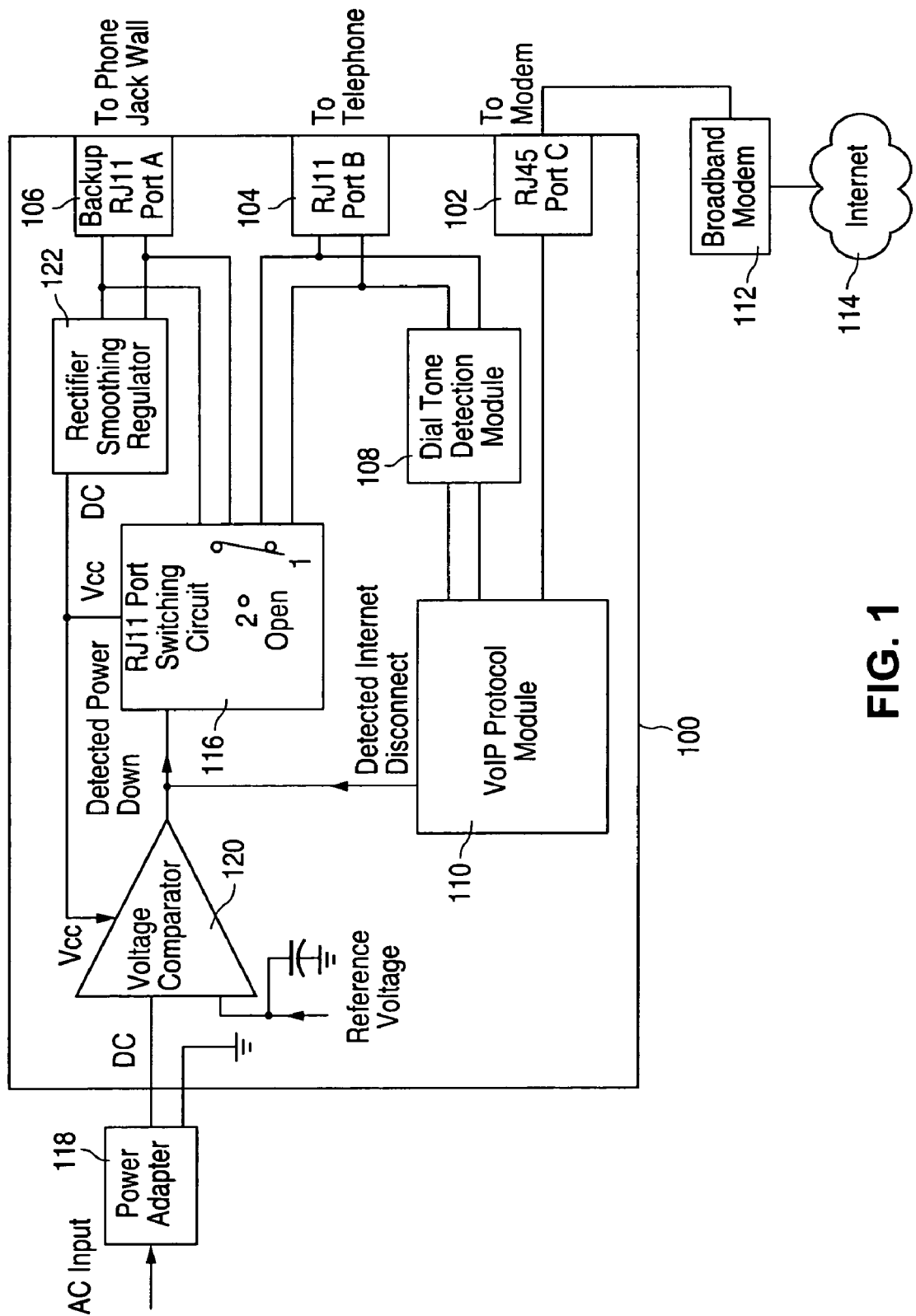
FIG. 1 is a block diagram of a Voice over IP (VoIP) adapter module according to one embodiment of the present invention.

FIG. 1 is a block diagram of a Voice over IP (VoIP) adapter module 100 according to one embodiment of the present invention for automatically switching a VoIP connection to a wired connection of a Plain Old Telephone Service (POTS) when a power outage or a loss of broadband connection is detected by the module, thereby enabling emergency 911 calls to be made. Adapter module has three ports, an RJ45 port 102, an RJ11 port 104, and a backup RJ11 port 106. RJ11 port 104 is connected to a telephone, such that signals to and from the telephone can be accessed by adapter module 100 through RJ11 port 104. Within adapter module 100, RJ11 port 104 is coupled to a dial tone detection module 108, which detects the presence of a dial tone for the telephone, as will be discussed in more detail below. Dial tone detection module 108 is coupled to a VoIP protocol module 110. VoIP protocol module 110 provides the necessary processing to facilitate VoIP communications through the Internet. VoIP protocol module 110 is coupled to RJ45 port 102, which in turn is coupled to a broadband modem 112, enabling communication through Internet 114. Thus, RJ45 port 102 and RJ11 port 104 provide an interface between the Internet 114 and a user telephone to enable VoIP communication, facilitated by VoIP protocol module 110.

RJ11 port 104 is also coupled to port switching circuit 116. Port switching circuit 116 is connected to backup RJ11 port 106. Port switching circuit 116 can be any conventional circuit that, upon receiving a control signal, either connects the two ports or leaves the two ports unconnected. Thus, in a normal situation, port switching circuit 116 acts as an open circuit between backup RJ11 port 106 and RJ11 port 104. As a result, when the user picks up the telephone to make a call or to answer a call, the connection goes through RJ45 port 102 and not backup RJ11 port 104 for a normal VoIP communication. However, upon receipt of a control signal that indicates power is down or not available to adapter module 100, port switching circuit 116 closes the circuit and connects RJ11 port 104 to backup RJ11 port 106. This then connects the telephone at RJ11 port 104 to make an emergency 911 call through a wired channel via backup RJ11 port 106. Thus, VoIP adapter module 100 has two RJ11 connectors or ports for two lines to connect an existing plain old telephone unit and a conventional wired telephone line. However, adapter module 100 may contain any number of telephone connection ports to connect multiple phones to the wired channel.

The control signal to port switching circuit 116 is generated from a voltage comparator circuit 120, such as an operational amplifier. Voltage comparator circuit 120 compares the voltage to the module with a reference threshold voltage, such as supplied by a battery, battery circuit, or other suitable voltage source. For example, the reference voltage can be taken from the Vcc source (Vcc * 70%) out of a rectifier smoothing regulator circuit 122. Adapter module 100 receives a DC line voltage, such as through an AC power adapter 118 coupled to a voltage source, e.g., a power outlet. The DC line voltage provides the power to operate the components for placing calls over the VoIP system. Comparator circuit 120 compares the DC line voltage with the reference voltage. If the DC line voltage is below the reference voltage, comparator circuit 120 transmits a signal to port switching circuit 116. If the signal from comparator circuit 120 indicates that power is below the threshold level for a power-down condition, port switching circuit 106 connects RJ11 port 104 to backup RJ11 port 106 to enable emergency 911 calling even when the power needed to operate the VoIP system is not available.

Power to voltage comparator 120 and port switching circuit 116 is provided by power through backup RJ11 port 106, i.e., through power carried by the wired channel. This power through the wired channel is first processed by a rectifier smoothing regulator 122 coupled between backup RJ11 port 106 and port switching circuit 116 and voltage comparator circuit 120.

Figure 2:
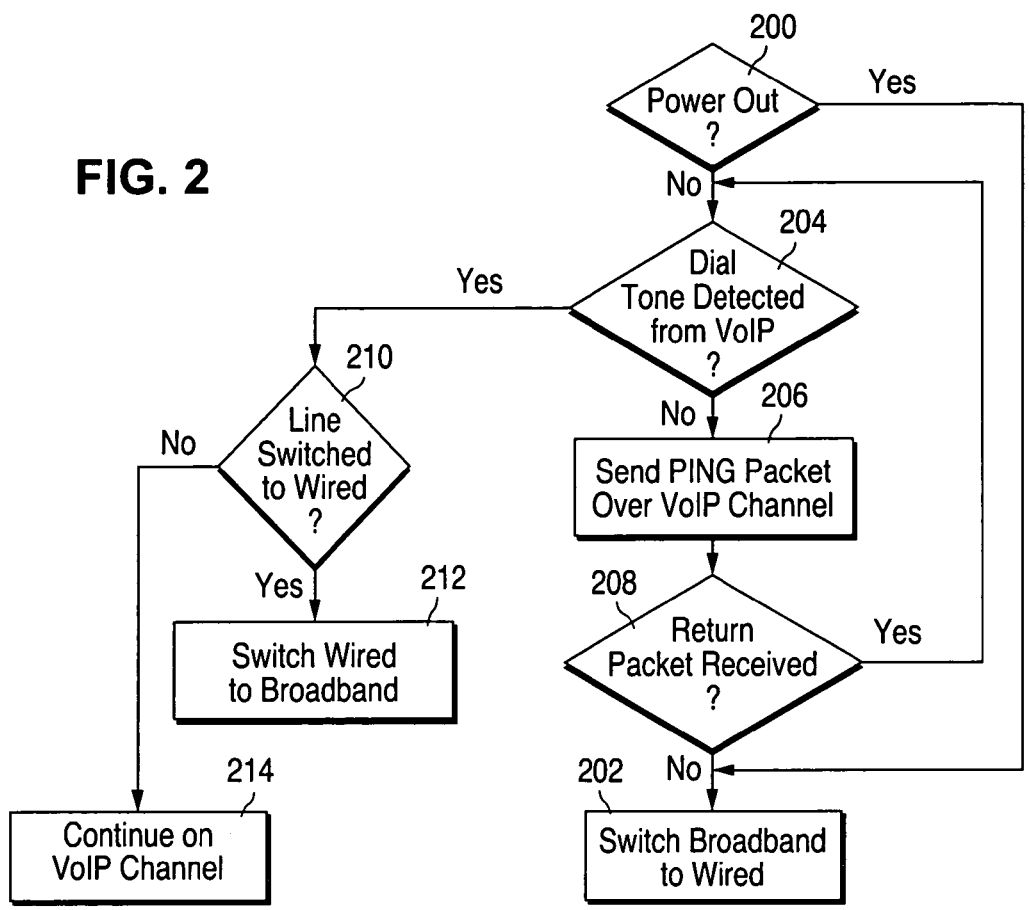
FIG. 2 is a flowchart illustrating a process for detecting conditions and automatic switching to enable emergency 911 calling according to one embodiment.

FIG. 2 is a flow chart illustrating a process for automatically switching to a wired channel to enable emergency 911 calling on a VoIP system when either power is out or the broadband connection is down. First, in operation 200, the VoIP system determines whether sufficient power is available to the system for making VoIP calls. This may be due to a power outage or power disruption, such as caused by a power supply failure or equipment malfunction. In one embodiment, the "power-down" condition is determined by comparing the voltage supplied to the VoIP system with a threshold voltage level. When the measured voltage is less than the threshold voltage, a power-down condition is identified. If the power is down, as determined in operation 200, the telephone is switched from the VoIP connection to a wired channel connection in operation 202. In one embodiment, the switching is accomplished by moving a switch, in response to a signal, to connect the telephone to an RJ11 port coupled to a phone wall jack with wired lines. When the switch is not moved, the connection is not made, and the telephone remains connected to the VoIP circuitry. Thus, when power is out, the user can still make an emergency 911 call through the wired channel.

However, if in operation 200, the power is determined to be adequate (i.e., not down), a determination is made, in operation 204, whether a dial tone is detected from the VoIP line. If no dial tone is detected, a packet, such as a PING packet, is transmitted over the VoIP channel in operation 206. The system then determines, in operation 208, whether a return packet was received within a specified period of time, e.g., 1 second. If no return packet was received during the time interval, the broadband connection is determined to be down. Thus, a "broadband down" condition is determined in operations 206 and 208. If the broadband connection is down, the telephone is switched from the VoIP line to a wired line in operation 202. The switch can be accomplished through closing or opening a switch in response to a signal. The user can then pick up the telephone and make an emergency 911 call even when the broadband connection is down or the power is out without having to manually switch phone connections.

If, as determined in operations 200 and 204, both power and dial tone are present, operation 210 determines whether the telephone has been switched over to the wired channel, such as a result of a power-down condition or a loss of broadband connectivity. If there has been a switch, the system switches the telephone connection back to VoIP, in operation 212, such as by opening the switch that connected the phone to the wired connection. However, if the telephone is on the VoIP line, the telephone remains connected to the VoIP line in step 214.

Figure 3:
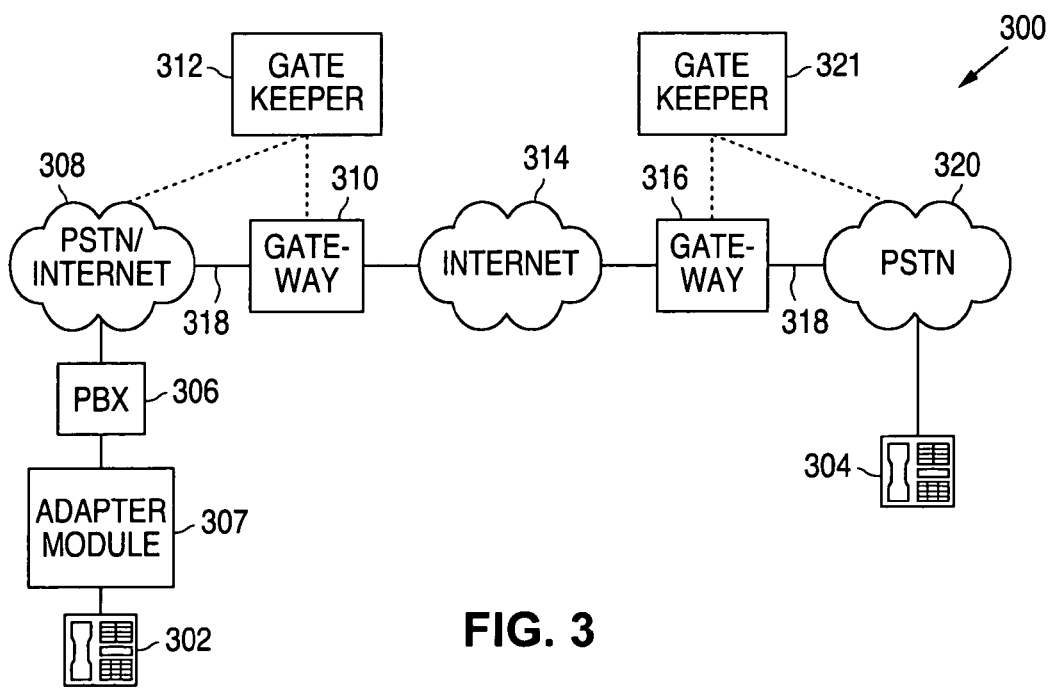
FIG. 3 is a diagram of an exemplary VoIP communication system using the VoIP module of FIG. 1 according to one embodiment.

FIG. 3 is a diagram of an exemplary VoIP communication system 300 that can be used with the VoIP adapter module and method of the present invention. VoIP system 300 includes a first telephone 302 and a second telephone 304. For discussion purposes, first telephone 302 is the originating telephone or the one initiating the emergency 911 call. First telephone 302 can be in a home, office, or any other suitable location. Second telephone 304 is the destination telephone or the one receiving the call and can be in a police station or other location for receiving and responding to 911 calls. To initiate a VoIP session, a user lifts a handset from the hook of first telephone 302. A dial tone is returned to first telephone 302 via a Private Branch Exchange (PBX) 306, assuming at least that sufficient power is available and the broadband connection is up. Note that PBXs are not required, with some systems having a direct connection between first telephone 302 and a Public Switched Telephone Network (PSTN)/Internet 308.

A VoIP adapter 307, such as described above, couples first telephone 302 to PSTN/Internet 308 and enables first telephone 302 to place an emergency 911 call through the VoIP network or through a conventional network.

When the user picks up the handset on first telephone 302, a dial tone is present, indicating a connection to the VoIP network or a conventional network if the broadband connection is down or power is out, as described above. When the user dials 911, PSTN/Internet 308 switches the call to a first or originating broadband gateway 310 if the VoIP network is operational. PSTN 308 also communicates a destination for the call to first gateway 310. As is known in the art, the gateway may determine which destination gateway a call should be sent to using a look-up table within first gateway 310. The destination gateway may also be determined by communicating with a gate keeper 312. First gateway 310 then attempts to establish a call with second telephone 304 via Internet 314, a second or destination broadband gateway 316, signaling lines 318, and PSTN 320. If second gateway 316 and PSTN 320 are capable of completing the call, second telephone 304 will ring.

When a user at second telephone 304, such as an emergency call operator, lifts a handset to answer the call, the operator's analog voice signal is transferred through PSTN 320 to second gateway 316 via lines 318. A gate keeper 321 can be used to direct signals from second PSTN 320 to an appropriate gateway, such as second gateway 316. All or some of the functions of first and second gate keepers 312 and 321 may be embedded within first and second gateways 310 and 316, respectively. During operation, gateways 310 and 316 convert circuit-switched communications received from PSTN/Internet 308 and PSTN 320, respectively, to a packet data protocol acceptable to the IP network. Gateways 310 and 316 also convert packet data received from the IP network to a circuit-switched protocol acceptable to PSTN/Internet 308 and PSTN 320, respectively.

Second gateway 316 then converts the first analog voice signal originating at second telephone 304 into packetized digital data (not shown) and appends a destination header to each data packet. The digital data packets may take different routes through Internet 314 before arriving at first gateway 310. First gateway 310 assembles the packets in the correct order, converts the digital data to a second analog voice signal recreating the operator's analog voice signal, and forwards the second analog voice signal to first telephone 302 via lines 318, PSTN/Internet 308, and PBX 306.

Broadband gateways 310 and 316 may be configured to provide one or more integrated communication interfaces to other devices within the customer premise equipment such as televisions, personal computers (PCs), plain old telephone service (POTS) phone(s), video phones, and IP-enabled phones. For example, the broadband gateways may provide one or more telephone port connections (e.g., POTS), Ethernet connections, coaxial connections, fiber distributed data interface (FDDI) connections, wireless local area network (LAN) connections, firewall connections, and/or other connections to a plurality of devices. These devices can include POTS telephones, IP-based phones, and television converters. Thus, broadband gateways 310 and 316 may support communications between any of the above-mentioned devices in intra-premises calling and/or extra-premises calling and couple these devices to the broadband network, e.g., Internet 314 using any suitable broadband communication mechanism.

A user at first telephone 302 can speak to the emergency 911 operator at second telephone 304 in a similar manner. The call is terminated when the handset of either first telephone 302 or second telephone 304 is placed on the hook of the respective telephone.

If the broadband connection is down or power is out, VoIP adapter module 307 switches the connection of first telephone 302 to a conventional wired channel through its backup RJ11 port. The emergency 911 call can then be placed through the wired channel using conventional methods.

Having thus described embodiments of the present invention, persons skilled in the art will recognize that changes may be made in form and detail without departing from the scope of the invention. For example, the VoIP adapter module is described as a separate external device; however, as those skilled in the art will appreciate, the functions of the adapter module can be easily performed within a phone or other existing device of the communication system. Thus the invention is limited only by the following claims.

What is claimed is:

1. A telephone detection and switching adapter, comprising:
    a switching circuit receiving a first control signal;
    a first telephone port adapted to couple to a wired communication channel;
    a second telephone port adapted to couple to a telephone, wherein the first and second telephone ports are coupled to the switching circuit and wherein the switching circuit is configured to connect the first and second telephone ports in response to the first control signal;
    a third port adapted as an Internet connection, wherein the second telephone port and the third port are coupled together to enable the telephone to make calls through the Internet connection;
    a VoIP protocol module coupled between the third port and the switching circuit, wherein the VoIP protocol module automatically outputs the first control signal if the Internet connection is down; and
    a voltage comparator coupled to the first telephone port that compares an external voltage with a reference voltage to determine whether sufficient power is available for making a VoIP call, wherein the voltage comparator and the switching circuit receives power from the wired communication channel through the first telephone port.

2. The adapter of claim 1, wherein an output of the voltage comparator is a second control signal.

3. The adapter of claim 2, wherein the switching circuit connects the first and second telephone ports when the second control signal indicates the power is out.

4. The adapter of claim 3, wherein the power out occurs when the voltage from the external voltage source is less than the reference voltage.

5. The adapter of claim 1, further comprising a regulator circuit coupled between the first telephone port and the switching circuit.

6. The adapter of claim 1, wherein the first and second ports are RJ11 ports and the third port is an RJ45 port.

7. The adapter of claim 1, further comprising a dial tone detection module coupled to the VoIP protocol module for detecting a dial tone though the third port and initiating the first control signal.

8. The adapter of claim 1, further comprising:
    a dial tone detection module coupled to the telephone via the Internet connection, wherein the output of the detection module is the first control signal, the dial tone detection module coupled to the input of the switching circuit via the VoIP protocol module, wherein the switching circuit connects the first and second telephone ports when the voltage comparator indicates power is out or when the detection module indicates the Internet connection is down.

9. A method of operating a Voice over Internet Protocol (VoIP) phone system having a telephone connected to a VoIP channel, comprising:
    supplying power from a wired communication channel through an RJ11 port to a voltage comparator and a switching circuit;
    detecting whether sufficient power is available to enable the VoIP phone system to make an Internet call;
    detecting whether a broadband connection is available; and
    automatically switching the telephone to a wired channel to enable emergency 911 calling when no sufficient power or no broadband connection is detected.

10. The method of claim 9, wherein detecting the power comprises comparing the voltage from an external voltage source to a reference voltage.

11. The method of claim 9, wherein detecting the broadband connection comprises:
    transmitting a packet along the VoIP channel when no dial tone is detected on the VoIP channel; and
    waiting a predetermined amount of time to receive a return packet.

12. The method of claim 9, wherein the switching is based on a received control signal indicating if no sufficient power is detected or no broadband connection detected.

13. A circuit for switching a telephone connection from Voice over Internet Protocol (VoIP) channel to a wired channel, comprising:
    means for supplying power from a wired communication channel to a voltage comparator and a switching circuit;

means for detecting whether sufficient power is available to enable a call to be made from the VoIP channel;

means for detecting whether a broadband connection is available; and means for automatically switching the telephone to the wired channel to enable emergency 911 calling when no sufficient power or no broadband connection is detected.

14. A telephone detection and switching adapter, comprising:
- a switching circuit receiving an automatic control signal indicating whether power or an Internet connection is unavailable;
- a first telephone port adapted to couple to a wired communication channel;
- a second telephone port adapted to couple to a telephone, wherein the first and second telephone ports are coupled to the switching circuit and wherein the switching circuit is configured to connect the first and second telephone ports in response to the control signal;
- a third port adapted to couple to the Internet, wherein the second and third ports are coupled to together to enable the telephone to make calls through the Internet; and
- a voltage comparator coupled to the first telephone port that compares an external voltage with a reference voltage to determine whether sufficient power is available for making a VoIP call, wherein the voltage comparator and the switching circuit receives power from the wired communication channel through the first telephone port.

* * * * *